(12) United States Patent
Mulvihill et al.

(10) Patent No.: US 7,066,516 B2
(45) Date of Patent: Jun. 27, 2006

(54) REAR VEHICLE STORAGE SYSTEM

(75) Inventors: James A. Mulvihill, Royal Oak, MI (US); Thomas S. Hicks, Livonia, MI (US); Won-Tai Kim, Macomb, MI (US)

(73) Assignee: Lear Corporation, Southfield, MI (US)

( * ) Notice: Subject to any disclaimer, the term of this patent is extended or adjusted under 35 U.S.C. 154(b) by 13 days.

(21) Appl. No.: 10/814,882

(22) Filed: Mar. 31, 2004

(65) Prior Publication Data

US 2005/0218680 A1 Oct. 6, 2005

(51) Int. Cl.
*B60N 3/00* (2006.01)

(52) U.S. Cl. .................. 296/24.4; 296/37.6; 296/26.11

(58) Field of Classification Search ............... 296/24.4, 296/37.6, 37.16, 37.1, 37.8, 63, 37.5, 65.09, 296/26.11; 297/378.12; 224/542, 404, 543, 224/925, 275, 491; 410/118, 129; 414/401
See application file for complete search history.

(56) References Cited

U.S. PATENT DOCUMENTS

| | | | | |
|---|---|---|---|---|
| 3,376,994 | A | * | 4/1968 | Flinn, Jr. ........................ 220/6 |
| 4,014,292 | A | * | 3/1977 | Coughlin et al. ............... 220/6 |
| 4,960,223 | A | * | 10/1990 | Chiang et al. .................. 220/6 |
| 5,167,479 | A | * | 12/1992 | Bott ............................ 410/121 |
| 5,392,972 | A | * | 2/1995 | Caruso et al. ............ 224/42.34 |
| 5,484,091 | A | * | 1/1996 | Malinowski et al. ........ 224/542 |
| 5,535,931 | A | * | 7/1996 | Barlow et al. .............. 296/37.6 |
| 5,628,442 | A | * | 5/1997 | Wayne ........................ 224/539 |
| 5,715,978 | A | | 2/1998 | Ackeret |
| 5,911,464 | A | * | 6/1999 | White ......................... 296/57.1 |
| 5,979,962 | A | * | 11/1999 | Valentin et al. ............. 296/37.1 |
| 6,015,071 | A | * | 1/2000 | Adomeit et al. ................ 220/6 |
| 6,050,202 | A | * | 4/2000 | Thompson ................ 296/37.16 |
| 6,092,708 | A | * | 7/2000 | Rand ......................... 296/37.16 |
| 6,138,883 | A | * | 10/2000 | Jackson et al. ............. 296/37.6 |
| 6,283,525 | B1 | * | 9/2001 | Morse ...................... 296/26.11 |
| 6,296,289 | B1 | | 10/2001 | Gehring et al. |
| 6,338,518 | B1 | * | 1/2002 | D'Annunzio et al. ....... 296/24.4 |
| 6,375,055 | B1 | * | 4/2002 | Spykerman et al. ......... 224/542 |
| 6,402,215 | B1 | * | 6/2002 | Leitner et al. ........... 296/26.11 |
| 6,412,847 | B1 | * | 7/2002 | De Gaillard ............... 296/37.6 |
| 6,425,618 | B1 | * | 7/2002 | Garland et al. ........... 296/26.11 |
| 6,474,714 | B1 | * | 11/2002 | Stettner .................... 296/26.11 |
| 6,481,773 | B1 | | 11/2002 | Salani et al. |
| 6,505,872 | B1 | * | 1/2003 | Hong ........................ 296/26.11 |
| 6,513,863 | B1 | * | 2/2003 | Renke et al. ............... 296/57.1 |
| 6,520,364 | B1 | * | 2/2003 | Spykerman et al. ........ 224/542 |
| 6,540,123 | B1 | * | 4/2003 | Kmita et al. ............. 296/26.11 |
| 6,550,836 | B1 | * | 4/2003 | Rigau ......................... 296/37.6 |
| 6,554,340 | B1 | * | 4/2003 | Stevenson ................... 296/37.6 |
| 6,609,743 | B1 | * | 8/2003 | Stevenson ................ 296/26.11 |
| 6,623,059 | B1 | | 9/2003 | Gehring et al. |
| 6,626,478 | B1 | * | 9/2003 | Minton ....................... 296/37.6 |
| 6,672,640 | B1 | * | 1/2004 | Gehring et al. .......... 296/37.16 |
| 6,676,182 | B1 | * | 1/2004 | Fitts ............................ 296/37.6 |
| 6,676,184 | B1 | | 1/2004 | Gehring et al. |

(Continued)

*Primary Examiner*—Kiran B. Patel
(74) *Attorney, Agent, or Firm*—MacMillan, Sobanski & Todd, LLC

(57) ABSTRACT

A vehicle storage assembly for a vehicle cargo area includes a storage panel and a flange portion extending outwardly from an end of the storage panel. The flange portion is adapted to be mounted to an interior component of a vehicle such that the storage panel is positionable to a stowed position, and a deployed position. In the deployed position, the storage panel divides at least a portion of the vehicle cargo area.

19 Claims, 4 Drawing Sheets

U.S. PATENT DOCUMENTS

| | | | |
|---|---|---|---|
| 6,676,185 B1* | 1/2004 | Gehring et al. | 296/37.5 |
| 6,719,345 B1* | 4/2004 | Ootsuka et al. | 296/26.11 |
| 6,733,060 B1* | 5/2004 | Pavkov et al. | 296/37.16 |
| 6,749,241 B1* | 6/2004 | Erlandsson et al. | 296/24.4 |
| 6,779,824 B1* | 8/2004 | Lazarevich et al. | 296/37.6 |
| 6,796,600 B1* | 9/2004 | Ferer et al. | 296/37.6 |
| 6,805,392 B1* | 10/2004 | Leitner et al. | 296/57.1 |
| 6,837,529 B1* | 1/2005 | Kharod et al. | 296/24.4 |
| 6,851,741 B1* | 2/2005 | Burg | 296/57.1 |
| 6,863,328 B1* | 3/2005 | Kiester et al. | 296/24.4 |
| 6,871,894 B1* | 3/2005 | Zummack | 296/24.4 |
| 2002/0000733 A1* | 1/2002 | Ryan | 296/37.1 |
| 2002/0014777 A1 | 2/2002 | Gehring et al. | |
| 2002/0070573 A1* | 6/2002 | Song | 296/37.6 |
| 2002/0079715 A1* | 6/2002 | Hong | 296/26.11 |
| 2002/0096901 A1* | 7/2002 | Iafrate et al. | 296/26.11 |
| 2002/0153737 A1* | 10/2002 | Fitts | 296/26.11 |
| 2002/0190535 A1 | 12/2002 | Gehring et al. | |
| 2003/0075943 A1* | 4/2003 | Kirchhoff | 296/26.11 |
| 2003/0082023 A1* | 5/2003 | Bernardo | 410/129 |
| 2003/0090121 A1 | 5/2003 | Gehring et al. | |
| 2003/0146637 A1* | 8/2003 | Leitner et al. | 296/26.11 |
| 2003/0209919 A1 | 11/2003 | Gehring et al. | |
| 2003/0214144 A1 | 11/2003 | Gehring et al. | |
| 2003/0218347 A1 | 11/2003 | Gehring et al. | |
| 2004/0020956 A1* | 2/2004 | Lobanoff | 224/542 |

* cited by examiner

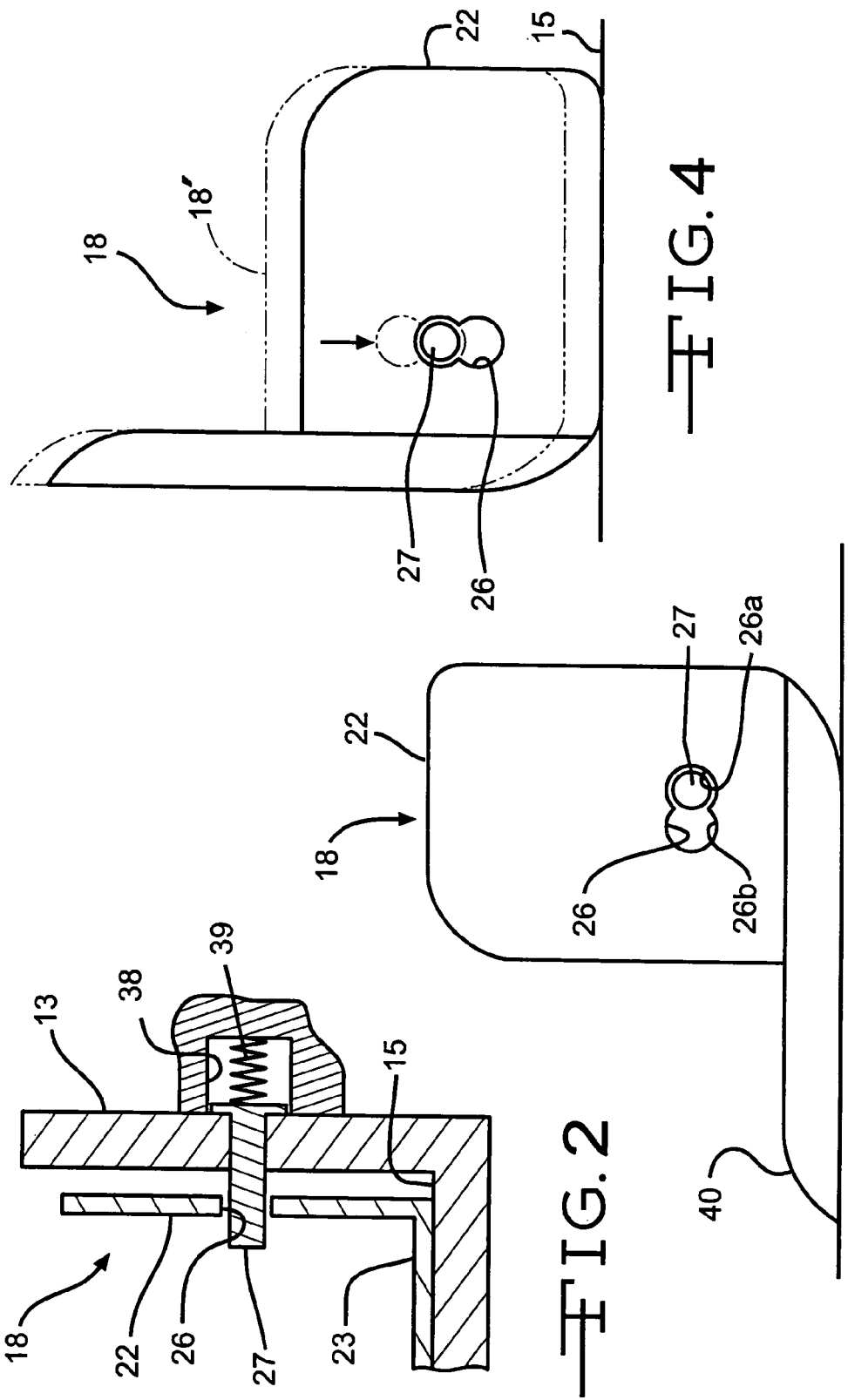

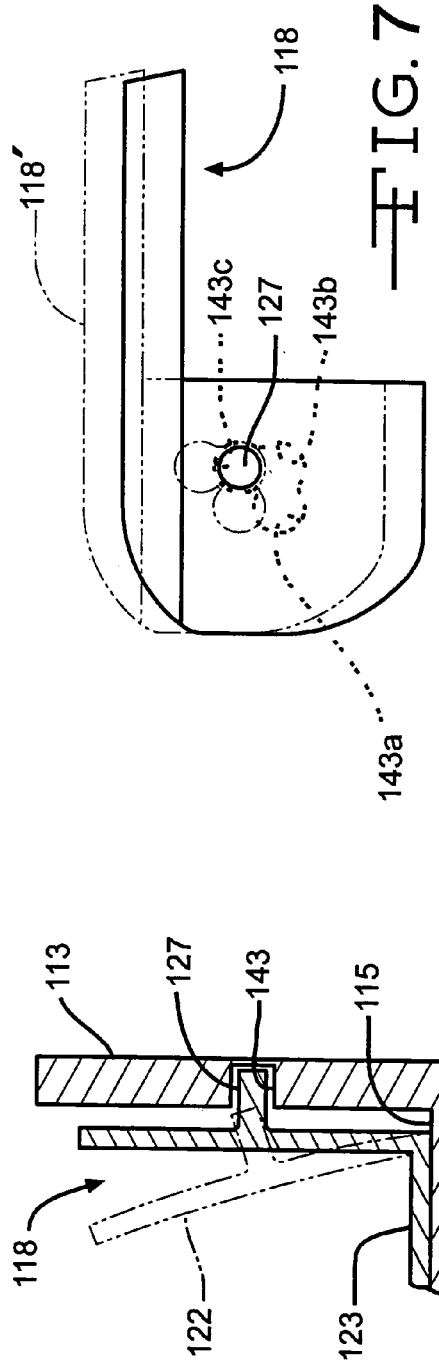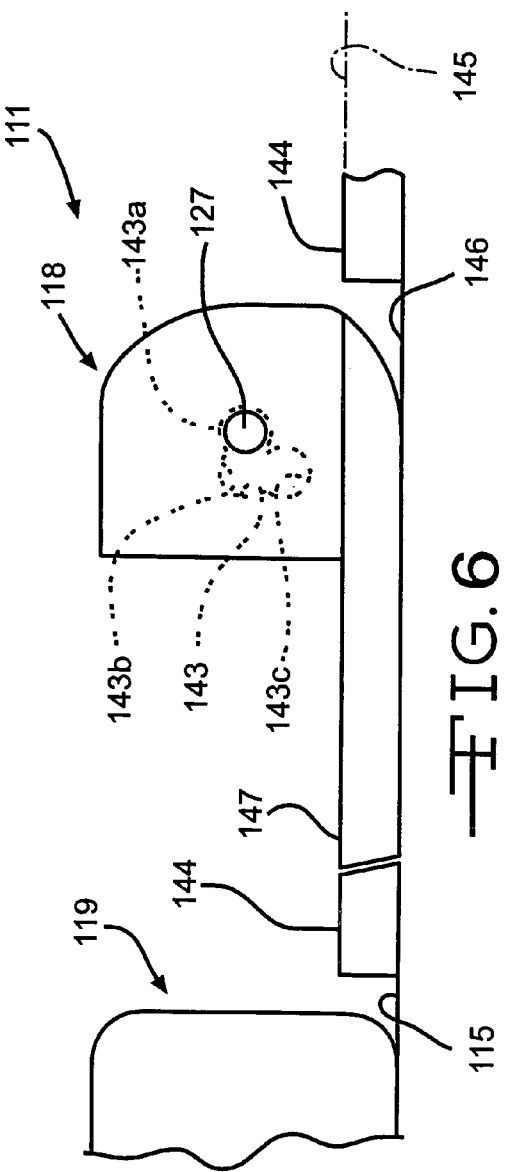

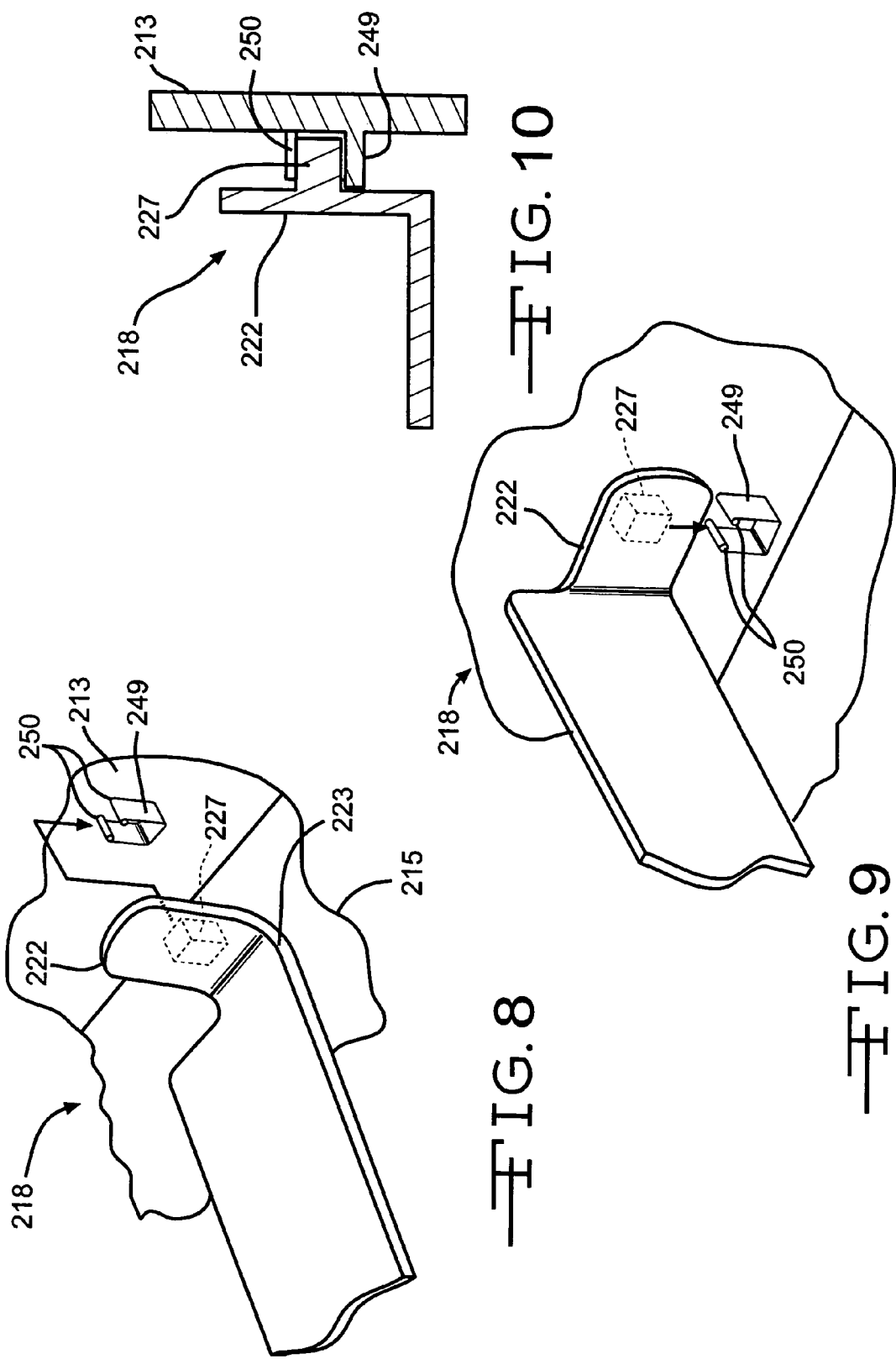

REAR VEHICLE STORAGE SYSTEM

BACKGROUND OF THE INVENTION

This invention relates in general to motor vehicles and, more particularly, to a storage assembly for motor vehicle cargo areas and trunk compartments which reduces the risk that cargo will shift, slide, or roll about the cargo area and trunk compartment during the operation of the motor vehicle.

Most motor vehicles are provided with cargo areas and trunk compartments for transporting and storing cargo. Cargo areas and trunk compartments are generally defined by a horizontal load surface extending between the motor vehicle side panels and the rearmost seat and rear end of the motor vehicle. The cargo transported and stored on the load surface typically shifts, slides, or rolls about the load surface in response to the motion of the motor vehicle induced by accelerating, braking, and turning.

It is desirable to prevent cargo from shifting about the load surface in an effort to prevent cargo from spilling or from being damaged when being transported or stored. It is also often desirable to separate various cargo to prevent the various cargo from intermixing and/or damaging one another.

Of recent popularity are cargo nets. Such nets are usually formed from flexible elastic cords having hooks or other fasteners that cooperate with eyes strategically located in the motor vehicle cargo area or trunk compartment. Such nets are limited in their applications. They fail to provide a rigid structure for receiving fragile cargo. Fastening the net can require the motor vehicle operator or passenger to bend and stretch into the cargo area or trunk compartment. Moreover, deployment of the net may require tension over the cargo that can crush and damage fragile cargo.

Various organizing arrangements have been proposed for use in motor vehicle cargo areas and trunk compartments. Such arrangements include partitions or racks that divide the cargo area or trunk compartment into a plurality of discrete storage areas. Some arrangements include partitions that are collapsible and removable to allow the arrangement to be folded and stored in a compact form. These arrangements may be expensive to manufacture, especially in the secondary market, and may be cumbersome to assemble. Moreover, such arrangements themselves fail to remain in a substantially fixed position.

A storage apparatus is needed that permits cargo to be transported and stored in a motor vehicle without shifting or spilling. A storage apparatus is needed that also allows for ease in storage and/or removal of apparatus when not desired for use within the vehicle.

BRIEF SUMMARY OF THE INVENTION

The present invention is directed towards a motor vehicle storage assembly that meets the foregoing needs. The vehicle storage assembly for a vehicle cargo area includes a storage panel and a flange portion extending outwardly from an end of the storage panel. The flange portion is adapted to be mounted to an interior component of a vehicle such that the storage panel is positionable to a stowed position, and a deployed position. In the deployed position, the storage panel divides at least a portion of the vehicle cargo area.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an enlarged cross-sectional view of a portion of the storage assembly shown in FIG. 1 taken along line 2—2.

FIG. 3 is an enlarged side view of a portion of the storage assembly shown in FIGS. 1 and 2 shown in a stowed position.

FIG. 4 is an enlarged side view of a portion of the storage assembly shown in FIGS. 1, 2, and 3 shown in a deployed position.

FIG. 5 is an enlarged cross-sectional view of a portion of an alternate embodiment of a storage assembly in accordance with the present invention.

FIG. 6 is an enlarged side view of a portion of the storage assembly shown in FIG. 5 shown in a stowed position.

FIG. 7 is an enlarged side view of a portion of the storage assembly shown in FIGS. 5 and 6 shown in a shelf position.

FIG. 8 is an enlarged perspective view of a portion of an alternate embodiment of a storage assembly shown prior to mounting to an interior component in a stowed position in accordance with the present invention.

FIG. 9 is an enlarged perspective view of a portion of the storage assembly shown in FIG. 8 shown prior to mounting to the interior component in a deployed position.

FIG. 10 is an enlarged cross-sectional view of a portion of the storage assembly shown in FIGS. 8 and 9 mounted to the interior component.

DETAILED DESCRIPTION OF THE PREFERRED EMBODIMENT

Figure 1:
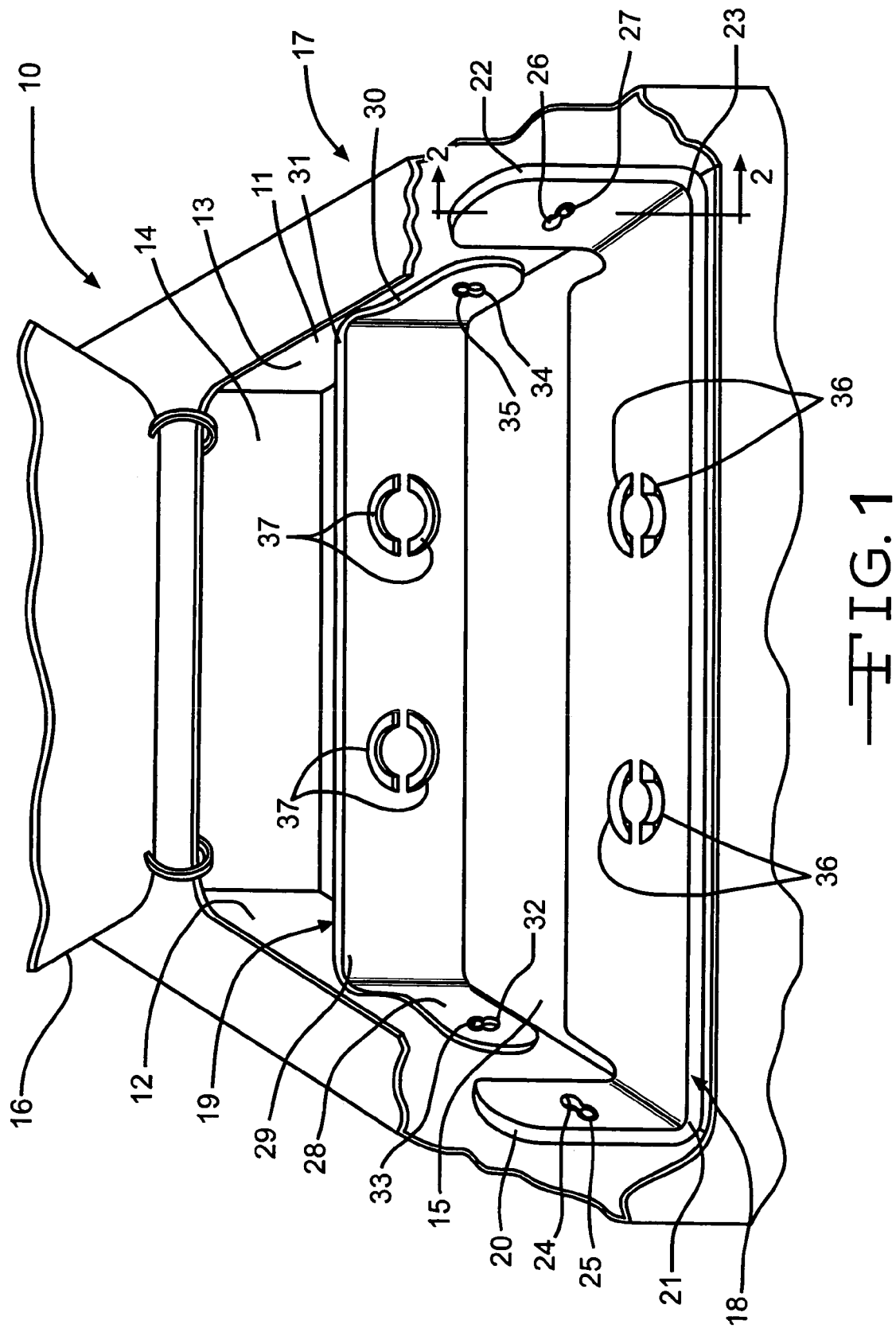
FIG. 1 is a rear perspective view of a motor vehicle cargo area with the motor vehicle cargo hatch opened for clarity and including a storage assembly in the motor vehicle cargo area, in accordance with the present invention.

Referring now to the drawings, there is illustrated in FIG. 1 a motor vehicle 10 having a cargo area or truck compartment 11 for storing and transporting cargo. The illustrated motor vehicle 10 and cargo area 11 are, in large measure, conventional in the art and are intended merely to illustrate one environment in which this invention may be used. Thus, the scope of this invention is not intended to be limited for use with the specific structure for the motor vehicle 10 or cargo area 11 illustrated in FIG. 1 or with motor vehicle cargo areas in general. On the contrary, as will become apparent below, this invention may be used in any desired environment for the purposes described below.

The cargo area 11 is generally bounded by opposing laterally spaced walls, each comprising interior components 12, 13 and a rear seat 14 or a wall of a trunk compartment, illustrated schematically in FIG. 1. A generally horizontal floor 15 or load surface is provided for supporting cargo. A cargo hatch or trunk lid 16 is generally provided to conceal the cargo area 11, however such is illustrated in an open position in FIG. 1 for clarity purposes.

A storage assembly, indicated generally at 17, is adapted to be retained in the cargo area 11. As illustrated, the storage assembly generally includes a first storage panel 18 and a second storage panel 19, although such is not required. It will be appreciated that the storage assembly 17 may have any number of storage panels, including a single storage panel.

The first storage panel 18 includes a first flange portion 20 extending outwardly from a first end 21 of the first storage panel 18 and a second flange portion 22 extending outwardly from a second end 23 of the first storage panel 18. As illustrated, the first flange portion 20 and the second flange portion 22 extend outwardly from the first end 21 and the second end 23 of the first storage panel 18, respectively, such that the first flange portion 20 and the second flange portion 22 are each generally perpendicular to the first storage panel 18, although such is not required. It will be appreciated that the first flange portion 20 and the second flange portion 22 may each extend outwardly from the first storage panel 18 at any angle.

The first storage panel 18 is adapted to be mounted to at least one of the components of the vehicle 10. For example, the first storage panel 18 may be mounted to the first interior component 12, the second interior component 13, the rear seat 14, or any other interior component of the vehicle 10. At least one of the first flange portion 20 and the second flange portion 22 may be adapted to mount the first storage panel 18 to any component of the vehicle 10. As illustrated, the first flange portion 20 and the second flange portion 22 are each adapted to mount the first storage panel 18 to the first interior component 12 and the second interior component 13, respectively, although such is not required. The first flange portion 20 includes an opening 24 formed therethrough that cooperates with a pin 25 to mount the first storage panel 18 to the first interior component 12. The second flange portion 22 includes an opening 26 formed therethrough that cooperates with a pin 27 to mount the first storage panel 18 to the second interior component 13. It will be appreciated that the first flange portion 20 and the second flange portion 22 may be adapted to mount the first storage panel 18 to the vehicle 10 in any suitable manner.

The second storage panel 19 includes a first flange portion 28 extending outwardly from a first end 29 of the second storage panel 19 and a second flange portion 30 extending outwardly from a second end 31 of the second storage panel 19. As illustrated, the first flange portion 28 and the second flange portion 30 extend outwardly from the first end 29 and the second end 31 of the second storage panel 19, respectively, such that the first flange portion 28 and the second flange portion 30 are each generally perpendicular to the second storage panel 19, although such is not required. It will be appreciated that the first flange portion 28 and the second flange portion 30 may each extend outwardly from the second storage panel 19 at any angle.

The second storage panel 19 is also adapted to be mounted to at least one of the components of the vehicle 10. For example, the second storage panel 19 may be mounted to the first interior component 12, the second interior component 13, the rear seat 14, or any other interior component of the vehicle 10. At least one of the first flange portion 28 and the second flange portion 30 may be adapted to mount the second storage panel 19 to any component of the vehicle 10. As illustrated, the first flange portion 28 and the second flange portion 30 are each adapted to mount the second storage panel 19 to the first interior component 12 and the second interior component 13, respectively, although such is not required. As illustrated, the first flange portion 28 includes an opening 32 formed therethrough that cooperates with a pin 33 to pivotally mount the second storage panel 19 to the first interior component 12. The second flange portion 30 includes an opening 34 formed therethrough that cooperates with a pin 35 to mount the second storage panel 19 to the second interior component 13. It will be appreciated that the first flange portion 28 and the second flange portion 30 may be adapted to mount the second storage panel 19 to the vehicle 10 in any suitable manner. For example, either one of the first flange portion 28 and the interior component 12 may have one of a pin and an opening and the other of the flange portion 28 and the interior component 12 may have the other of the pin and the opening to facilitate mounting the second storage panel 19 to the interior component 12.

As illustrated, the first storage panel 18 and the second storage panel 19 are each pivotally mounted to the vehicle 10, although such is not required. Each of the first storage panel 18 and the second storage panel 19 are movable to a stowed position, as illustrated for the first storage panel 18 in FIG. 1, and a deployed position for dividing at least a portion of the vehicle cargo area 11, as illustrated for the second storage panel 19 in FIG. 1. Each of the first storage panel 18 and the second storage panel 19 may be rotatably or pivotally movable between the respective stowed and deployed positions, although such is not required. Each of the first storage panel 18 and the second storage panel 19 may include at least one handle 36, 37, respectively, to facilitate movement and/or installation of the first storage panel 18 and the second storage panel 19 within the vehicle 10, although such is not required.

Referring now to FIG. 2, the first storage panel 18 is illustrated mounted to the second interior component 13. The pin 27 is secured to the second interior component 13 and extends through the opening 26 in the second flange portion 22 of the first storage panel 18. As illustrated, the pin 27 is retained within a recess 38 in a portion of the second interior component 13. The pin 27 is biased by a spring 39, such that the pin 27 is urged outward from the second interior component 13. The pin 27 may be depressed by a user against the urging of the spring 39, such that the pin 27 is pushed deeper within the recess 38 and the pin 27 no longer extends through the opening 26 in the second flange portion 22 of the first storage panel 18. Thus, the second flange portion 22 of the first storage panel 18 may be released from the second interior component 13. It will be appreciated that the first storage panel 18 may be mounted to the second interior component 13 in any suitable manner, and that the pin 27 is exemplary of a suitable mounting means. It will further be appreciated that the pin 27 may be mounted to either the second interior component 13 and/or the second flange portion 22 of the first storage panel 18 in any suitable manner, and further, the recess not required. Additionally, it will be appreciated that the pin 27 may be formed integral to either the second interior component 13 or the second flange portion 22, as will be described in more detail herein.

Referring now to FIG. 3, the first storage panel 18 is mounted to the second interior component 13 in the stowed position, as also illustrated in FIGS. 1 and 2. Thus, the first storage panel 18 is generally parallel to the load surface 15 and may rest thereon. The first flange portion 20 and the second flange portion 22 are disposed generally parallel to the first interior component 12 and the second interior component 13. With the first storage panel 18 in the stowed position, the pin 27 extends through the first portion 26a of the opening 26.

In a preferred embodiment, the first storage panel 18 is rotatable from the stowed position to an intermediate position shown by phantom lines 18' in FIG. 4. From the intermediate position, the first storage panel 18 may then be pushed downward relative to the second interior component 13 and the pin 27, as shown in FIG. 4. During this movement, the pin 27 is forced from the first portion 26a of the opening 26 into the second portion 26b of the opening 26. The first storage panel 18 is now in the deployed position in which the first storage panel 18 is generally perpendicular to the load surface 15. The first storage panel 18 is now oriented relative to the second interior component 13 in a manner similar to that illustrated for the second storage panel 19 in FIG. 1. In a preferred embodiment, from the deployed position, the first storage panel 18 cannot rotate back to the stowed position without being first lifted to the intermediate position, because the second flange portion 22 is shaped to rotate from the pivot point formed by the first portion 26a of the opening 26, but not the second portion 26b of the opening 26 due to the interference of the floor 15. Thus, the first storage panel 18 is locked in the deployed position until the first storage panel 18 is lifted sufficiently to move the first storage panel 18 so that the pin 27 returns to the first portion 26a of the opening 26 where the first storage panel 18 is again free to rotate to the stowed position without interference from the floor 15.

It will be appreciated that the first storage panel 18 may extend across either of the length or the width of the cargo area 11 to divide the cargo area 11, although such is not required. The first storage panel 18 may extend partially or fully across the any dimension or plane of the cargo area 11. The first storage panel 18 may extend partially across the cargo area 11 and may be mounted to one of the first interior component 12, the second interior component 13, the rear seat 14, or any other interior component of the vehicle 10 by the first flange portion 20, and may not include a second flange portion 22.

It will also be appreciated that at least one edge 40 of the first storage panel 18 may be tapered, such that the storage panel 18 gradually rises in height from the load floor 15, although such is not required. Thus, the first storage panel 18 and the load floor 15 do not form an abrupt step therebetween along at least one edge 40 of the first storage panel 18.

It will further be appreciated that the elements described herein for the first storage panel 18 and the second storage panel 19 may be combined or included in either the first storage panel 18, the second storage panel 19, or both. It will also be appreciated that the first storage panel 18 and the second storage panel 19 have similar elements or may each have a different combination of the elements described herein.

Referring now to FIG. 5, there is illustrated a second embodiment of a first storage panel, indicated generally at 118, in accordance with the present invention. The first storage panel 118 is similar to the storage panel 18 and generally only the components that differ will be described herein. Many of the components of the first storage panel 118 as illustrated in FIG. 5 are similar in structure and function to corresponding components of the first storage panel 18 as illustrated in FIGS. 1 through 4. Therefore, such corresponding components are indicated by similar reference number in these Figures, but with the components of the first storage panel 118 as illustrated in FIGS. 5 through 7 having the addition of 100 to each reference number.

The first storage panel 118 includes a flange portion 122 extending outwardly from an end portion 123. The flange portion 122 includes an integrally formed pin 127 extending outwardly therefrom. The pin 127 extends outwardly from the flange portion 122, such that the pin 127 may be disposed within an opening 143 formed in the interior component 113 to mount the first storage panel 118 to the interior component 113. The storage panel 118 or portions thereof may be slightly elastic or flexible to facilitate installation, removal, and repositioning of the first storage panel 118 relative to an interior component 113. For example, as shown in phantom in FIG. 5, the flange portion 122 of the first storage panel 118 may be flexed or compressed inwardly to facilitate installation of the pin 127 within the opening 143 in the interior component 113.

As shown in FIG. 6, the first storage panel 118 and a second storage panel 119, shown partially in FIG. 6, are mounted to the interior component 113, such that the first storage panel 118 and the second storage panel 119 are in a spaced apart relationship on a load surface 115. Disposed between and around the first storage panel 118 and the second storage panel 119 are a plurality of partitions 144, although such is not required. The partitions 144 are sized to have generally the same height as the first storage panel 118 and the second storage panel 119. When the first storage panel 118 and the second storage panel 119 are in the stowed position, as shown in FIG. 6, the partitions 144, the first storage panel 118, and the second storage panel 119 form a generally flat load surface 145 atop the load surface 115. It will be appreciated that the partitions 144 are not required, and if present, the partitions 144 may be disposed between each of the mounted storage panels, surrounding each of the storage panels, or any combination thereof. In a preferred embodiment, each pair of the partitions 144 define recesses 146, respectively, and each storage panel provided within the cargo area 111 is disposed within one of recesses 146.

It will be appreciated that an end 147 of the first storage panel 118 may be shaped to allow the first storage panel 118 to rotate as will be described below and correspond to the shape of the adjacent one of the partitions 144 to create a more seamless load surface 145, although such is not required.

The first storage panel 118 operates in a manner similar to that described above for the first storage panel 18. In the stowed position, as illustrated in FIG. 6, the pin 127 is disposed within a first portion 143a of the opening 143. From the stowed position, the first storage panel 118 is rotatable, as illustrated in FIGS. 6 and 7 in a clockwise manner, approximately 90° about the pivot point created by the pin 127 in the first portion 143a of the opening 143 to a first intermediate position. From the first intermediate position, the first storage panel 118 may be moved toward the load floor 115, such that the pin 127 is forced into a second portion 143b of the opening 143 and the first storage panel 118 is now in a deployed position, similar to the deployed position described for the first storage panel 18 in the prior embodiment.

From the deployed position, the first storage panel 118 is rotatable, as illustrated in FIG. 7 in a clockwise manner, approximately 90° further about the pivot point created by the pin 127 in the second portion 143b of the opening 143 to a second intermediate position, as shown by phantom lines 118' in FIG. 7. From the second intermediate position, the first storage panel 118 may be moved toward the load floor 115, such that the pin 127 is forced into a third portion 143c of the opening 143 in communication with the second portion 143b of the opening 143. The first storage panel 118 is now in a shelving position, as illustrated in FIG. 7, in which the first storage panel 118 may be generally parallel to and spaced apart from the load surface 115, and in a locked position such as when in the deployed position. The first storage panel 118 may be designed to allow objects to be stored on the first storage panel 118 and below the first storage panel 118.

Referring now to FIG. 8, there is illustrated a third embodiment of a first storage panel, indicated generally at 218, in accordance with the present invention. The first storage panel 218 is similar to the storage panel 18 and only the components that differ will be described herein. Many of the components of the first storage panel 218 as illustrated in FIG. 8 are similar in structure and function to corresponding components of the first storage panel 18 as illustrated in FIGS. 1 through 4. Therefore, such corresponding components are indicated by similar reference number in these Figures, but with the components of the first storage panel 218 as illustrated in FIGS. 8 through 10 having the addition of 200 to each reference number.

The first storage panel 218 includes a flange portion 222 extending outwardly from an end portion 223. The flange portion 222 includes an integrally formed pin 227 extending outwardly therefrom. The pin 227 preferably has a non-circular cross-section, such as generally rectangular in cross-section, although such is not required. The pin 227 extends outwardly from the flange portion 222, such that the pin 227 may be disposed within a correspondingly shaped slot 249 formed in or extending from an interior component 213 to mount the first storage panel 218 to the interior component 213. It will be appreciated that the pin 227 and the slot 249 may be any suitable shape. The slot 249 may include a pair of tabs 250 extending inwardly into the slot 249. The slot 249 and the pair of tabs 250 may be slightly flexible, such that the pin 227 may force the pair of tabs 250 away from one another to allow the pin 227 to enter the slot 249. Once the pin 227 is received within the slot 249, the pair of tabs 250 retain the pin 227 within the slot until enough force is applied to the first storage panel 218 and the pin 227 to again separate the pair of tabs 250 from one another and release the pin 227 from the slot 249.

Unlike the first storage panel 18, the first storage panel 218 is not pivotally mounted to the respective interior component 213. The pin 227 and slot 249 are correspondingly shaped such that the slot 249 will receive the pin 227 when the first storage panel 218 is positioned in a stowed position, as shown in FIG. 8, or a deployed position, as shown in FIG. 9. It will be appreciated that the slot 249 could additionally receive the pin 227 when the first storage panel 218 is position in a shelving position as described for the previous embodiment, although such is not required.

To move from one position to another, the pin 227 of the first storage panel 218 is removed from the slot 249, as described above. The first storage panel 218 is then repositioned relative to the interior component 213, such that the pin 227 is aligned to be accepted in the slot 249. The pin 227 is then forced through the pair of tabs 250, such that the pin 227 enters the slot 249, as described above and shown in FIG. 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A storage assembly for a vehicle cargo area comprising:
   a storage panel; and
   a flange portion extending from said storage panel, said flange portion being fixed in position relative to said storage panel,
   wherein said flange portion is adapted to be mounted to an interior component of a vehicle such that said storage panel and said flange portion are positionable to a stowed position in which said storage panel is generally parallel to a load surface of the vehicle cargo area, and a deployed position for dividing at least a portion of the vehicle cargo area.

2. The storage assembly according to claim 1, wherein said storage panel is pivotally mounted to said interior component of said vehicle.

3. The storage assembly according to claim 1, wherein one of said flange portion and said interior component has one of a pin and an opening, and wherein the other of said flange portion and said interior component has the other of said pin and said opening to facilitate mounting said storage panel to said interior component.

4. The storage assembly according to claim 1, wherein said storage panel extends across one of the length and the width of the vehicle cargo area to divide the vehicle cargo area.

5. The storage assembly according to claim 1, wherein said flange portion includes a first opening and a second opening in communication with one another, said first opening defining a first pivot point and said second opening defining a second pivot point, said first opening and said second opening each adapted to receive a pin to facilitate pivotable movement of said storage panel between said stowed position and said deployed position.

6. The storage assembly according to claim 5, wherein said interior component of said vehicle includes at least one spring loaded pin corresponding to each of said openings within said at least one flange portion.

7. The storage assembly according to claim 5, wherein said storage panel is flexible such that said storage panel may be compressed to allow said opening in said flange portion to be positioned around at least one corresponding pin mounted within said vehicle.

8. The storage assembly according to claim 1, wherein said flange portion comprises a pair of flanges, each of said pair of flanges on a respective end of said storage panel, and wherein said storage panel may be mounted to said vehicle by said pair of flanges.

9. The vehicle storage assembly according to claim 1, wherein said storage panel is disposed within a recess within said load surface of said vehicle when said storage panel is in said stowed position.

10. The storage assembly according to claim 1, wherein said storage panel rests on top of said load surface of said vehicle when said storage panel is in said stowed position.

11. The storage assembly according to claim 10, wherein said storage panel is tapered such that an upper surface of said storage panel tapers to meet said load surface when said storage panel is in said stowed position.

12. The vehicle storage assembly according to claim 1, wherein said storage panel is movable to a shelving position in which said storage panel is generally parallel to a generally horizontal load surface of said vehicle and spaced vertically apart from said load surface.

13. The vehicle storage assembly according to claim 12, wherein said flange portion includes a three-point pivot shaped opening to facilitate the pivotable movement of said storage panel between said stowed position, said deployed position, and said shelving position.

14. The vehicle storage assembly according to claim 12, wherein said flange portion includes a first opening and a second opening in communication with one another, and a third opening in communication with said second opening.

15. The vehicle storage assembly according to claim 14, wherein said first opening and said third opening are spaced apart from one another by said second opening.

16. The vehicle storage assembly according to claim 12, wherein said first opening defines a first pivot point, said second opening defines a second pivot point, and said third opening defines a third pivot point, said first opening adapted to receive a pin to retain said storage panel in said stowed position, said second opening adapted to receive a pin to retain said storage panel in said deployed position, and said third opening adapted to receive a pin to retain said storage panel in said shelving position.

17. A combined cargo area and storage assembly comprising:

a cargo area including a wall and a floor; and a storage panel including a flange portion that is supported on said wall of said cargo area, said flange portion being fixed in position relative to said storage panel, said storage panel being movable between stowed position, wherein said storage panel extends generally parallel to said floor of said vehicle cargo area, and a deployed position, wherein said storage panel extends from said floor of said cargo area so as to divide at least a portion of said cargo area.

18. The combined cargo area and storage assembly according to claim 17, wherein said flange portion includes a first opening and a second opening in communication with one another, said first opening defining a first pivot point and said second opening defining a second pivot point, said first opening and said second opening each adapted to receive a pin to facilitate pivotable movement of said storage panel between said stowed position and said deployed position.

19. The combined cargo area and storage assembly according to claim 18, wherein said interior component of said vehicle includes at least one spring loaded pin corresponding to each of said openings within said at least one flange portion.

* * * * *